United States Patent [19]
Bennett et al.

[11] 3,988,735
[45] Oct. 26, 1976

[54] CONTROL CIRCUIT FOR DRIVING A POSITION INDICATOR IN AN AIRCRAFT FLIGHT DATA DISPLAY

[76] Inventors: William E. Bennett, 2393 S. Windward Cir., Westlake Village, Calif. 91360; Imon E. Leach, 1711 Stoner Ave., Los Angeles, Calif. 90025

[22] Filed: June 2, 1975

[21] Appl. No.: 582,623

[52] U.S. Cl. ............................ 343/112 PT; 340/24; 340/27 NA
[51] Int. Cl.² .......................................... G01S 3/02
[58] Field of Search ............... 343/112 PT, 112 TC, 343/112 C; 340/23, 24, 27 NA

[56] References Cited
UNITED STATES PATENTS

| | | |
|---|---|---|
| 3,648,231 | 3/1972 | Owens, Jr. et al. ............ 340/27 NA |
| 3,715,716 | 2/1973 | Stiegemeier ........................... 340/23 |
| 3,886,515 | 5/1975 | Cottin et al. ........................... 340/23 |
| 3,899,769 | 8/1975 | Honore et al. ......................... 340/24 |

*Primary Examiner*—Maynard R. Wilbur
*Assistant Examiner*—T. M. Blum

[57] ABSTRACT

The invention is a control circuit for driving a position indicator along a map screen in an aircraft flight data display. The control circuit is electrically coupled to a navigational system from which it receives digital information. The control circuit includes a decoder for decoding this information and a pair of digital to analog converters for converting the decoded information to a first analog signal and a second analog signal. These two analog signals drive a pair of servo motors which are mechanically coupled to the position indicator.

4 Claims, 6 Drawing Figures

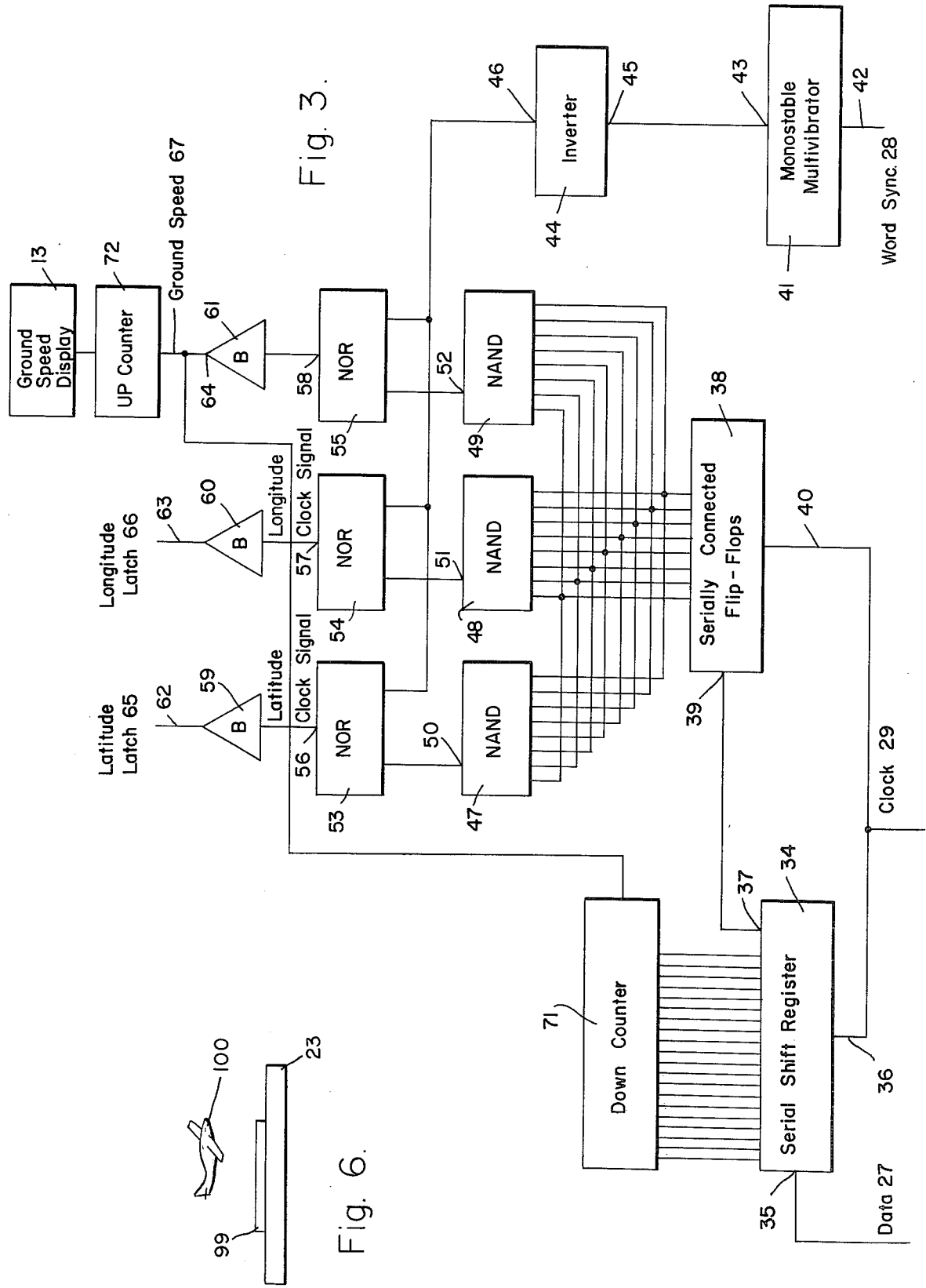

CONTROL CIRCUIT FOR DRIVING A POSITION INDICATOR IN AN AIRCRAFT FLIGHT DATA DISPLAY

BACKGROUND OF THE INVENTION

1. Field of the Invention

The present invention relates to display screens and more particularly to progressive display screens adapted to indicate the ground position of an aircraft with respect to a map and especially such a device which is placed on the aircraft and adapted to indicate the position of the aircraft within thirty miles of its exact location.

2. Statement of the Prior Art

In the past aircrafts had been provided with various types of screens indicating that the seat belts should be fastened and that smoking was not allowed during various periods during flight and subsequently various types of advertising screens were provided in which various operations were displayed for advertising purposes, but no aircraft had an aircraft position display having a map screen along with a position indicator varying with the location of the aircraft.

Harry C. Danaher holds U.S. Pat. No. 3,660,847, issued May 2, 1972, entitled *Aircraft Position Display*, in which he teaches a display device which indicates by a series of lamps on a map screen the location on the aircraft relative to a particular Omni transmitting station, with one of the lamps being lighted to indicate that Omni station to which the aircraft is nearest. A switching arrangement located in the cockpit is dialed to the same frequency number as the Omni receiver, so the pilot need not do any calculations or exert any effort to select which light to turn on. Further, by providing a memory unit a string of lamps may be lighted to represent the flight path and the lamps will remain on during the entire flight. The display consists of a matrix of lamps, which are positioned to coincide with the geographical locations of the Omni transmitting stations. An Omni receiver in the aircraft picks up the signal from a particular Omni station and the pilot is able to select the proper lamp to switch on.

Jean R. Stregemair holds U.S. Pat. No. 3,715,716, issued Feb. 6, 1973, entitled *Progressive Display Screen*, in which he teaches a device for indicating on a map screen the position of an aircraft to the passengers on the aircraft without the complexity of locating the position with the accuracy normally required in navigation. The device of Stregemeir is able to give only the approximate location of the aircraft during flight. A position indicator usually in the shape of a model aircraft is connected to a guide belt for guiding the position indicator along the map screen along a predetermined route of the aircraft.

SUMMARY OF THE INVENTION

In view of the foregoing factors and conditions characteristic of the prior art, it is a primary object of the present invention to provide a device for indicating the location of an aircraft on a map screen.

It is another object of the invention to provide a relatively simple device for indicating the location on a map screen of an aircraft to the passenger on the aircraft which handles the complexity of locating the position with a high degree of accuracy, although not as much accuracy as is normally required in navigation.

It is still another object of the present invention to provide a device for indicating the location of an aircraft which is independent of both ground speed and wind speed.

It is still another object of the invention to eliminate the matrix of lamps and replace this matrix of lamps with a single moveable lamp.

It is yet another object of the invention to provide geographical information to the passengers in a continuous manner without significant interruption of the cockpit crew's schedule.

It is still yet another object of the invention to provide a visual display for the passenger compartment of an aircraft which relates the location of the aircraft at the time to the geographical area independent of a predetermined flight plan and particularly a display which uses information already available in the cockpit without substantial additional duties for the crew in maintaining the display current.

It is yet still another object of the present invention to provide an automatic display which neither the pilot nor any other crew member need do anything to maintain it current.

In accordance with the present invention a device for indicating the location of an aircraft on map screen to passengers in which signals from the Inertial Navigational System (INS) are operated upon to give the aircraft's latitude and longitude. An embodiment of the present invention is used in a Flight Data Display having a map screen which is coupled to a position indicator which includes a lamp lighted by a lighting circuit, a platform upon which the lamp and lighting circuit is mounted, a pair of parallel tracks along which the platform travels, a rod orthogonally disposed to the parallel tracks and mechanical coupling to a pair of servo motors for guiding the platform horizontally and vertically along the map screen. The present invention includes a pair of digital to analog converters coupled to the servo motors for providing an electrical signal to operate each of them and a decoder which is coupled electrically to the Inertial Navigational System and which decodes data received therefrom into latitudinal and longitudinal digital signals, which are then transmitted to one of the digital to analog converters.

The features of the present invention which are believed to be novel are set forth with particularity in the appended claims. Other objects and many more of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWINGS

FIG. 3 is a schematic drawing of the circuitry of a decoder for decoding digital information from the Inertial Navigational System into the necessary signals to display the latitudinal and longitudinal position and the ground speed of the aircraft.

FIG. 6 show an alternate embodiment of the present invention in which the lamp and the lighting circuit of the preferred embodiment are replaced by a model aircraft fabricated of magnetic material and a magnet placed on the platform.

DESCRIPTION OF THE PREFERRED EMBODIMENT

Figure 1:
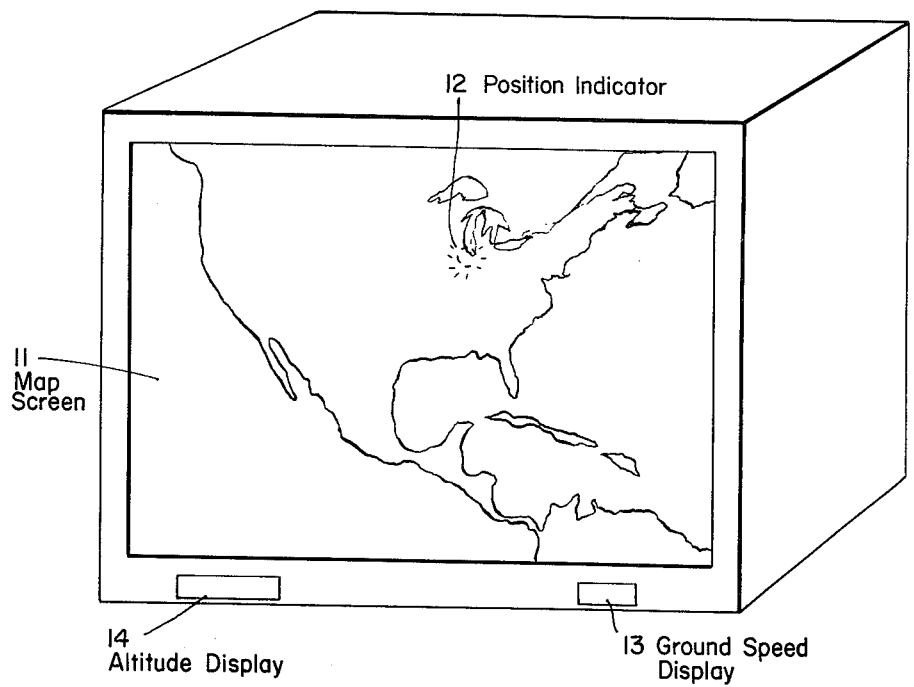
FIG. 1 is a perspective drawing of an Aircraft Flight Data Display System in which a position indicator is used in accordance with the present invention, a control circuit, to show the location of an aircraft.

The preferred embodiment of the present invention is shown in FIG. 1 as it is used in an Aircraft Flight Data Display 10. The Data Display 10 includes a map screen 11, a position indicator 12, which indicates the location of an aircraft on the map screen 11, a ground speed display 13 and an altitude display 14. Data from the Central Air Data System (CADS) is used to determine the altitude and this information is transmitted electrically to the altitude display 14. Data from the Inertial Navigational System (INS), or any other navigational system having an electronic, digital output, is used to determine ground speed, latitude and longitude of the aircraft.

Figure 2:
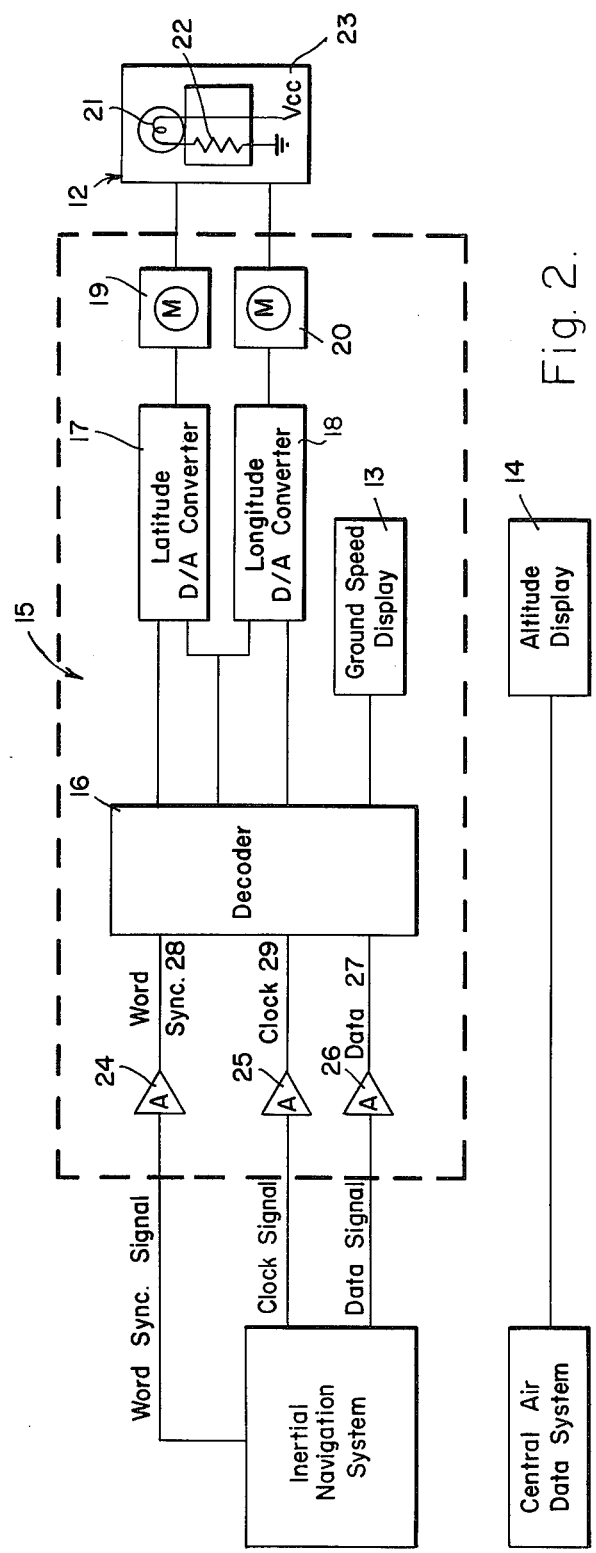
FIG. 2 is a schematic diagram of the control circuitry of the Aircraft Flight Data Display System and illustrates the electrical coupling of the Inertial Navigational System and the Central Air Data System to the control circuitry.

Referring now to FIG. 2 the Inertial Navigation System and the Central Air Data System are shown electrically coupled to a control circuit 15, which includes a decoder 16, a latitude digital to analog converter 17, a longitude digital to analog converter 18 and a pair of servo motors 19 and 20, which are electrically coupled to and driven by the outputs of the two digital to analog converters 17 and 18. Also shown in FIG. 2 is a position indicator 12 which includes a lamp 21 and a lighting circuit 22 mounted on a platform 23. The two servo motors 19 and 20 are mechanically coupled to the platform 23 and drive it along the map screen 11 in two orthogonal directions.

The Inertial Navigation System provides a data signal, a word sync signal and a clock signal, all of which are amplified by three operational amplifiers 24, 25 and 26. The decoder 16 receives the amplified data signal, hereinafter designated DATA 27, the amplified clock signal, hereinafter designated CLOCK 28, and the amplified word sync signal, hereinafter designated WORD SYNC 29. The Central Air Data System provides an altitude signal 30 and transmitts it directly to the altitude display 14.

The DATA 27 is a thirty two bit digital word carrying information relating to ground speed of the aircraft, its latitudinal position and its longitudinal position. The first eight bits of the DATA 27 carry information relating to which variable is contained in the thirteenth bit through the thirty-second bit. No information is carried on the ninth through twelfth bit. The decoder 16 receives the DATA 27 and determines whether the information relates to ground speed, latitudinal position or longitudinal position. If the DATA 27 relates to ground speed, it is decoded and transmitted to the ground speed display 13. If the DATA 27 relates to latitudinal or longitudinal position, it is transmitted to the two digital to analog converters 17 and 18 and the decoder sends a latitude enable signal, hereinafter designated LATITUDE LATCH 31 or a longitude enable signal, hereinafter designated LONGITUDE LATCH 32, both of which signals are generated according to the information contained in the first eight bits of DATA 27. The decoder 16 transmit only the 13th bit through the 32nd bit of DATA 27 to the converters 17 and 18. The information contained on this 20-bit word is hereinafter designated DECODED DATA 33.

The decoder 16 can best be understood by reference to FIG. 3 wherein a schematic drawing of the circuitry of the decoder 16 is shown. The decder 16 includes a 24-bit shift register 34, having an input terminal 35, a clock terminal 36, 24 output terminals including a 24th output terminal 37, and eight serially connected flip flop circuits 38, the first of which has an input terminal 39 electrically coupled to the 24th output terminal 37 of the serial shift register 34 and all of which have clock terminals 40 electrically coupled to CLOCK 28. The clock terminal 36 of the serial register 34 is also electrically coupled to CLOCK 28.

Still referring to FIG. 3, the decoder 16 also includes a monostable multivibrator 41, having an input terminal 42 and an output terminal 43, an inverter 44 having an input terminal 45 and an output terminal 46. The input terminal 45 of the inverter 44 is electrically coupled to the output terminal 43 of the monostable multivibrator 41. The WORD SYNC 29 is electrically coupled to the input terminal 42 of the monostable multivibrator 41.

Each of the flip-flop circuits 38 has two complementary output terminals. These complementary output terminals are electrically coupled to the input terminals of three eight input nand gates 47, 48 and 49, each of which has an output terminal 50, 51 and 52 respectively, according to a predetermined code determined by the navigational system used. Three two input nor gates 53, 54 and 55, each having one input terminal coupled to the output terminal of the inverter 44 and the other input terminal one of the three output terminals 50, 51 and 52 of the eight input nand gates 47, 48 and 49 and having an output terminal 56, 57 and 58 respectively. Each of these output terminals 56, 57 and 58 is electrically coupled to a buffer circuit 59, 60 and 61 respectively. The three buffer circuits 59, 60 and 61 having output terminals 62, 63 and 64 respectively.

Operationally the decoder 16 is cycled through 32 clock pulses by CLOCK 28 before it transmits DECODED DATA 33 to the digital to analog converters 17 and 18. The first eight bits of the 32-bit word comprising DATA 27 are located in the eight serially connected flip flop circuits 38 at the end of the 32nd clock pulse, at which time the DECODED DATA 33 is transmitted in parallel to one of the digital to analog converters 17 and 18. The WORD SYNC 29 triggers the monostable multivibrator 41 providing a positive or high signal, which is subsequently inverted by the inverter 44 to a negative or low signal and transmitted to one of the inputs of each of the three two input nor gates 53, 54 and 55. The arrangement of the output terminals of the eight serially connected flip flop circuits 38 coupled electrically to the input terminals of the three eight input nand gates 47, 48 and 49 is such that only the seventh and eighth bit of DATA 27 are necessary to determine which nand gate will have a negative or low signal at its output terminal 50, 51 or 52. Depending on the particular coding used by the navigational system used to provide the digital data this arrangement may be altered. The output signal at output terminal 50 is hereinafter designated LATITUDE LATCH 65; the output signal at output terminal 51 is hereinafter designated LONGITUDE LATCH 66; the output signal at output terminal 52 is hereinafter designated GROUND SPEED 67. LATITUDE LATCH 65, LONGITUDE LATCH 66, and GROUND SPEED 67 are electrically coupled to three buffers 62, 63 and 64 respectively.

When the DATA 27 is carrying ground speed information, GROUND SPEED 67 activates a downcounter, which is electrically coupled in parallel to the output terminals of the 24 serial shift register 34, thereby filling downcounter 71 with digital data representing ground speed in nautical miles per hour. The downcounter 71 begins to count down at a specified rate. GROUND SPEED 67 also activates an upcounter 72, which is electrically coupled to the ground speed display 13 which display ground speed in statute miles per hour. The upcounter 72 counts up at a rate that is in the same ratio to the specified rate of the downcounter 71 as nautical miles are to statute miles.

Figure 4:
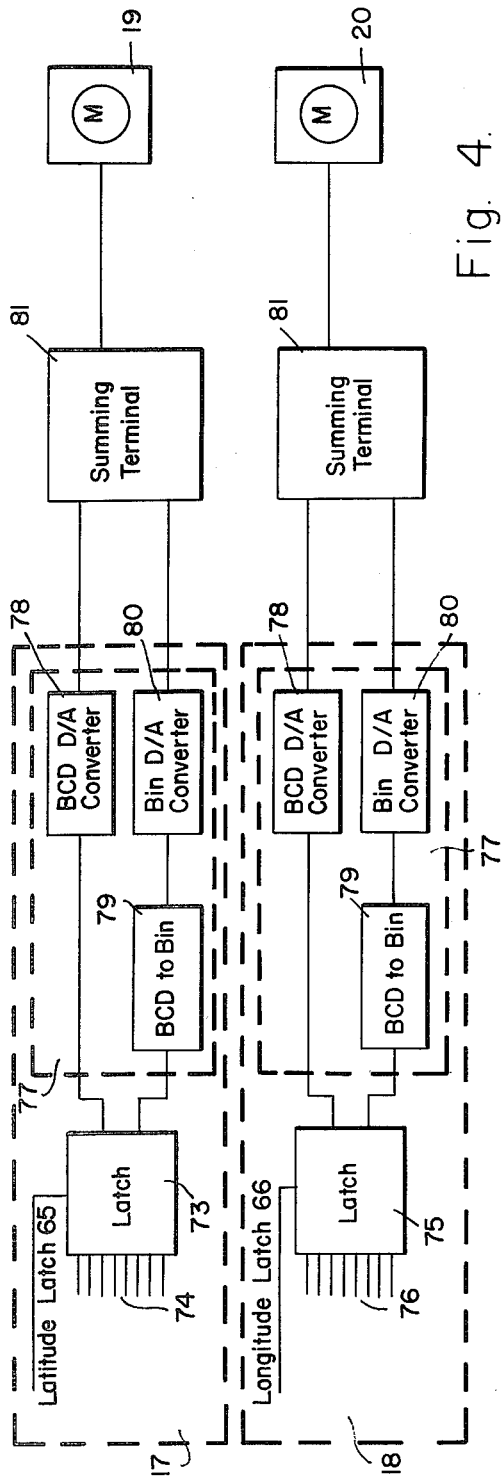
FIG. 4 is a schematic drawing of the circuitry of a latitude digital to analog converter and a longitude digital to analog converter, which are essentially identical to each other.

Referring now to FIG. 4, the first and second digital to analog converters 17 and 18 are identical in function and operation, but differ in that the latitude, or first, digital to analog converter 17 provides latitude signals ranging from 90° S to 90° N and the longitude, or the second, digital to analog converter 18 provides longitude signals ranging from 180° E to 180° W. The latitude digital to analog converter 17 includes a latch circuit 73, having 20 input terminals 74 electrically coupled to the output terminals of the serial shift register 34, which is activated by LATITUDE LATCH 65. The latch circuit 73 has output terminals, at which DECODED DATA 33 appears when the latch circuit is activated. The longitude digital to analog converter 18 also includes a latch circuit 75, having 20 input terminals 76 electrically coupled to the output terminals of the serial shift register 34. The latch circuit 75 is activated by LONGITUDE LATCH 66. The latch circuit 75 has output terminals, at which DECODED DATA 33 appears when the latch circuit is activated.

Each of the two converters 17 and 18 includes a combined digital to analog converter 77 which consists of a binary coded decimal digital to analog converter 78, which is a Teledyne Philbrick converter, component number 4027, a binary coded decimal to binary converter 79, which is a Texas Instrument converter, component number SN74184, and a binary digital to analog converter 80, which is a Teledyne Philbrick converter, component number 4021 and which is electrically coupled to the binary coded decimal converter 79.

The component of DECODED DATA 33 representing the degree (°) portion of the signal is transmitted directly to the binary coded decimal digital to analog converter 78 from the output terminal of one of the latch circuits 73 or 75. The remaining component representing the minute (') portion of the signal is electrically transmitted to the binary coded decimal to binary converter 79 from the output terminal of the same latch circuit 73 or 75. The outputs of the binary converter 80 and the binary coded decimal converter 78 are summed together at a summing output terminal 81 of the combined digital to analog converter 77. Each of these summing output terminals 81 is electrically coupled to one of the servo motors 19 or 20.

Figure 5:
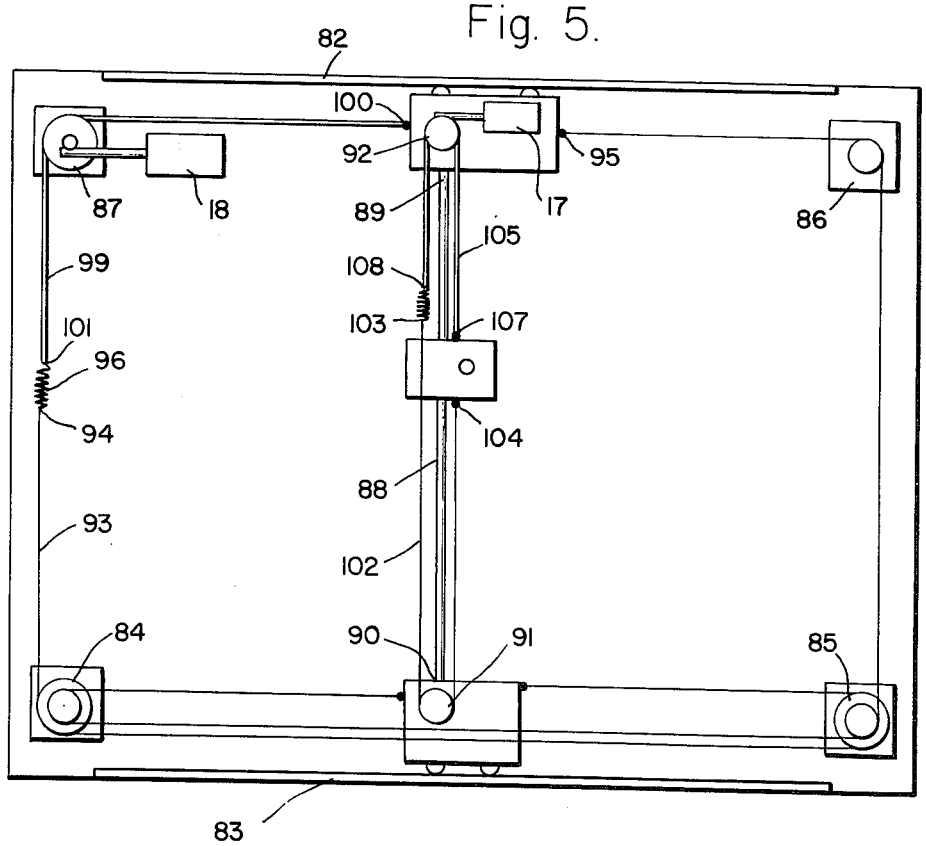
FIG. 5 illustrates how a platform, on which a lamp and a lighting circuit is mounted, is mechanically coupled to a pair of servo motor, electrically coupled to and driven by the digital to analog converters, so that lamp may travel across a map screen thereby indicating the position of the aircraft.

The mechanical coupling of the position indicator 12 to the two servo motors 19 and 20 is best shown by reference to FIG. 5 wherein a pair of parallel tracks 82 and 83 are disposed at the top and bottom of the map screen 11, a pair of double guide wheels 84 and 85 are disposed at the two bottom corners of the map screen 11, a single guide wheel 86 is disposed in the top right hand corner of the map screen and a driving guide wheel 87, coupled mechanically to the longitude servo motor 20, is disposed in the top left hand corner of the map screen 11. A crossbar 88, upon which the platform 23 is slideable coupled, is disposed orthogonally to the parallel tracks 82 and 83 in the same plane as the map screen 11. The crossbar 88 has a top end 89 and a bottom end 90, both of which have been adapted to slideably travel along the parallel tracks 82 and 83. A single guide wheel 91 is disposed at the bottom end 90 and a driving guide wheel 92, coupled mechanically to the latitude servo motor 19, is disposed at the top end 89. A first guide wire 93 having a first end 94 and a second end 95 has its first end 94 connected to the bottom end 90 of the crossbar 88 and is placed in the first wheels of the double guide wheels 84 and 85. A second guide wire 96 having a first end 97 and a second end 98 has its first end 97 connected to the top end 89 of the crossbar 88 and is placed in the single guide wheel and second wheels of the double guide wheels 84 and 85. The second end 98 of the second guide wire 96 is connected to the bottom end 90 of the crossbar 88. A chain 99, mechanically coupled to the driving guide wheel 87, has a first end 100 and a second end 101. Its first end 100 is fixedly joined to the second end 95 of the first guide wire 93 and its second end 101 is fixedly joined to the top end 89 of the crossbar 88. The inventor ha placed a spring in series with the chain 99 and the first guide wire in order to keep the guide wire 93 taut during operation of the mechanical system. A second guide wire 102, having a first end 103 and a second end 104, has its first end 103 fixedly joined to the platform 23 and is placed on the single guide wheel 91 disposed at the bottom end 90 of the crossbar 88. A second chain 105, having a first end 106 and a second end 107, is mechanically coupled to the driving guide wheel 92. The first end 106 of the chain 105 is fixedly joined to the platform 23 and the second end 107 is fixedly joined to the second end 104 of the second guide wire 102. The inventor has placed a spring in series with the chain 105 and the second guide wire 102 in order to keep the guide wire 105 taut during operation of the mechanical system.

In an alternative embodiment of the present invention the inventor has replaced the lamp 21 and the lighting circuit 22 with a model aircraft 108, which has been fabricated from a magnetic material, and a magnet 109 which is mounted on the platform 23. This embodiment is shown in FIG. 6.

Until the present invention there have been no Aircraft Flight Data Display which have been able to provide geographical information to the passengers on the aircraft accurate to within thirty miles. Those other displays were able to give only approximate locations of the aircraft during flight because their information was from a secondary source. In one instance the geographical locations were shown along a predetermined route which did not take into account that the aircraft does not always stay on course. In a second instance the data is transmitted from an Omni transmitting station and received by the aircraft's Omni receiver which enables the pilot to determine in which Omni zone the aircraft is. The present invention receives its information from a primary source, the Inertial Navigation System, which provides data which is very accurate, this data is reduced by a control circuitry which is electrically coupled to the two servo motors, which in turn are mechanically coupled to the position indicator. The advantage of such a control circuitry is that it is completely automatic and extremely accurate.

From the foregoing it can be seen that a control circuitry for a position indicator has been described. The control circuitry is used in an Aircraft Flight Data Display to guide a position indicator in its movement across a map screen. Additionally, it should be noted that use of this control circuitry eliminates the need for any manual effort by the pilot or any member of the crew as in one instance of the prior art and the need to use a predetermined route in another instance of the prior art. Furthermore, it should be noted that the electrical schematic is not drawn to scale and that resistors and capacitors have been omitted in circuits where their use is to eliminate noise, to provide reference voltages and the like. The specification has emphasized functional blocks and has often combined several integrated circuits to form one functional integrated circuit. The specific integrated circuits may be substituted with any functionally equivalent circuits and the naming of one circuit should not be considered significant.

Accordingly, it is intended that the foregoing disclosure and showing made in the drawings shall be considered only as illustrations of the principles of the invention. The inventor sets out what he believes to be his invention in the claims that are appended to the foregoing specification.

What is claimed is:

1. In an aircraft flight data display, a device for controlling the movement of the position indicator on a map screen displaying the location of an aircraft, wherein a navigational system continuously provides information, in the form of digital signal containing a plurality of bits, regarding the latitude, longitude and ground speed of the aircraft from its data terminal, a clock signal from its clock terminal and a word sync signal from its word sync terminal, said device including:
    a. a first converting means for converting the digital data to a first analog signal, said first converting means being activated by said first enable signal and being electrically coupled to said decoding means;
    b. a second converting means for converting the digital data to a second analog signal, said second converting means being activated by said second enable signal and being electrically coupled to said decoding means;
    c. first driving means for driving the position indicator vertically along the map screen in accordance with said first analog signal, electrically coupled to said converting means;
    d. second driving means for driving the position indicator horizontally along the map screen in accordance with said second analog signal, electrically coupled to said second converting means; and
    e. decoding means for decoding the digital signal into digital data and for providing a first enable signal and a second enable signal, electrically coupled to the data terminal, the clock terminal and the word sync terminal, said decoding means comprising:
        1. a serial shift register having a clock terminal, electrically coupled to the clock terminal, an input terminal, electrically coupled to the data terminal, and a plurality of output terminals;
        2. a plurality of serially connected flip flop circuits, each having a clock terminal, electrically coupled to the clock terminal, an input terminal, the first of which is electrically coupled to the last of said output terminals of said serial shift register, and a pair of complementary output terminals;
        3. a monostable multivibrator having an input terminal electrically coupled to the word sync terminal and an output terminal;
        4. an inverter having an input terminal electrically coupled to said output terminal of said monostable multivibrator and an output terminal;
        5. a plurality of nand gate circuits, each of which has a plurality of input terminals each of which is electrically coupled to one of said complementary output terminals of each of said flip flop circuits and each having an output terminal; and
        6. a plurality of nor gate circuits, each having a first input terminal electrically coupled to said output terminal of said inverter and a second input terminal electrically coupled to one of said output terminals of said nand gate circuits.

2. A device for controlling the movement of a position indicator along a map screen according to claim 1, wherein said first and said second converting means are identical and said first converting means comprises:
    a. first latching means for latching the digital data into said first converting means, electrically coupled to said decoding means and activated by said first enable signal; and
    b. a first combined digital to analog converter having a plurality of input terminals electrically coupled to said first latching means and a first combined summing output terminal electrically coupled to said first driving means.

3. A device for controlling the movement of a position indicator along a map screen according to claim 2, wherein said first combined digital to analog converter comprises:
    a. a first binary coded decimal digital to analog converter electrically coupled to a portion of the digital data representing degrees and having an output terminal electrically coupled to said combined summing output terminal;
    b. a first binary coded decimal to binary converter electrically coupled to a portion of the digital data representing minutes and having an output terminal; and
    c. a first binary digital to analog converter having an input terminal electrically coupled to said output terminal of said first binary coded decimal to binary converter and an output terminal electrically coupled to said combined summing output terminal.

4. A device for controlling the movement of a position indicator along a map screen in accordance with claim 3, wherein said first and second driving means are identical and said first driving means comprises:
    a. an operational amplifier having an input terminal electrically coupled to said first combined summing output terminal and an output terminal;
    b. a servo motor electrically coupled to said output terminal of said operational amplifier; and
    c. means for mechanically moving the position indicator along the map screen mechanically coupled to said servo motor.

* * * * *